July 15, 1941. O. FLECK Re. 21,855

PLOW ATTACHMENT

Original Filed Jan. 9, 1939

INVENTOR
O. FLECK.

BY

ATTORNEYS.

Reissued July 15, 1941

Re. 21,855

UNITED STATES PATENT OFFICE 21,855

PLOW ATTACHMENT

Otto Fleck, Botha, Alberta, Canada

Original No. 2,182,020, dated December 5, 1939, Serial No. 250,058, January 9, 1939. Application for reissue September 3, 1940, Serial No. 355,275

3 Claims. (Cl. 97—189)

This invention relates to improvements in a plow attachment and more particularly to rear end support means for large plows having three or more plow shares or bottoms. Its primary object is to provide means controlling the depth to which the plow shares enter the ground and to ensure an even depth of furrow being plowed immaterial of whether the ground be hard or soft.

A further object of the invention is to provide a wheel detachably mounted on the rear end of the plow and travelling on the unplowed land at the outside of the furrow to form a rear support for the plow beams and the plow shares or bottoms carried thereby.

With these and other objects in view that may appear while the description proceeds, the invention consists in the novel construction and arrangement of parts as hereinafter more specifically set forth, claimed and shown in the accompanying drawing forming part of this invention and in which:

Figure 1:
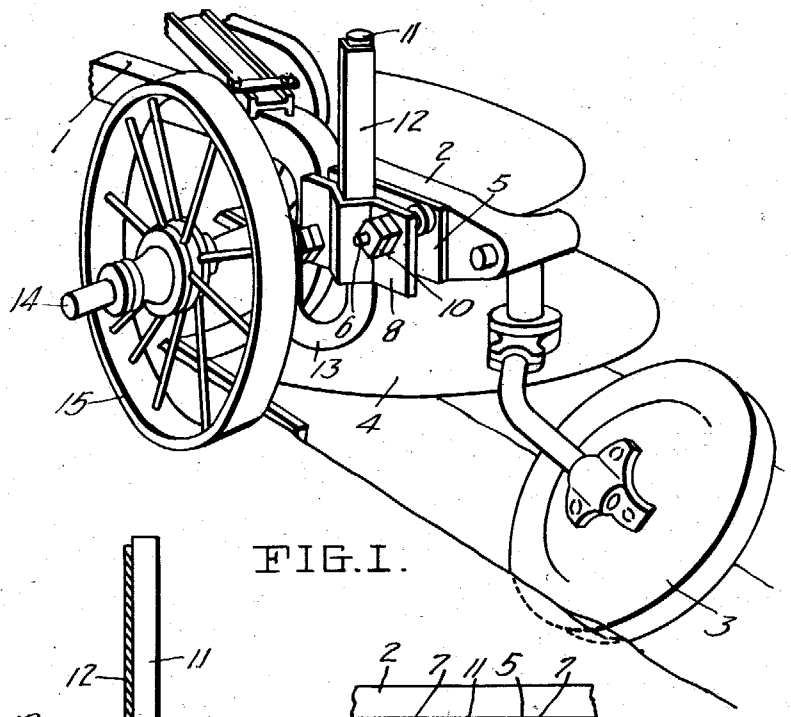
Fig. 1 is a perspective view of the rear end of a plow showing the furrow wheel, some of the plow bottoms and my support attachment.
Figure 3:
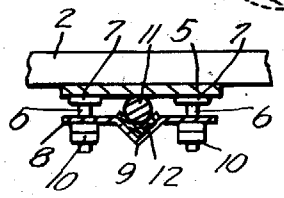
Fig. 3 is a cross sectional view through the adjustable attachment means.
Figure 2:
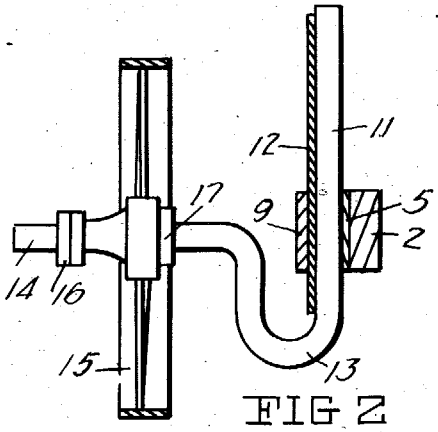
Fig. 2 is a sectional view through my supporting wheel and mountings.
Figure 4:
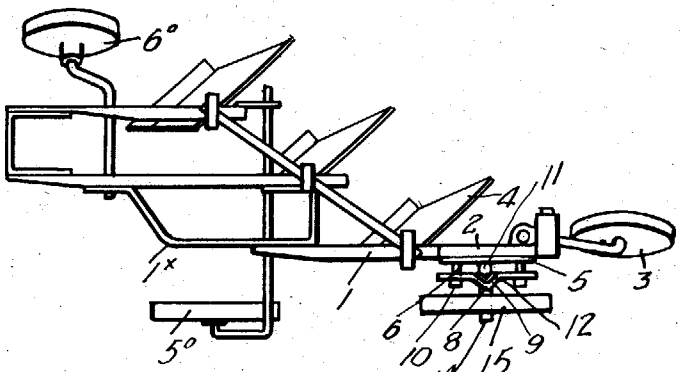
Fig. 4 is a plan view of a gang plow structure and my supporting wheel at the rear of the land side of the frame.

Referring more in detail to the drawing in which similar reference characters designate corresponding parts throughout the several views it will be seen the invention consists of a plow beam 1, carrying the usual bracket 2 supporting the furrow wheel 3 and the mould boards 4 as in Fig. 4. The front portion of the frame $1^x$ of the plow is provided with a land wheel $5^0$ and a carrier wheel $6^0$ in accordance with the usual practice. Secured preferably to the bracket 2 is a plate 5 by means of threaded studs 6 having annular enlargements or collars 7 formed thereon. The outer ends of the studs 6 are also threaded and on which is mounted a clamping plate 8 provided with a vertically extending V 9, nuts 10 being provided to secure the said plate on the studs.

A vertical shank 11 is provided with a V shaped plate 12 which fits the recess 9 in the plate 8. The lower portion of the shank 11 is formed into a U shaped portion 13 from which a horizontal axle 14 extends and on which is mounted a land wheel 15 retained thereon by collars 16 and 17.

Normally the wheel 15 is set to travel parallel to the direction of travel of the plow but if desired for any reason the direction may be changed by loosening the nuts 10 on one side of the shank and tightening the nuts on the other side.

If the plow depended for its rear end support on the furrow wheels 3 alone the said rear end would rise and fall according to the condition of the soil forming the furrow bottom which may be either hard or soft.

By using the wheel 15 at the rear of the plow to ride on the unplowed land which is always comparatively hard and dry the rear of the plow travels in a level plane and therefore the plow shares always plow to the same depth. The wheel 15 is adjustable vertically so that the plow may be carried at any convenient height to suit requirements.

It will be understood that the bracket 2 will differ to suit different makes of types or sizes of plows, and therefore, the mounting of the rear end support attachment may also differ accordingly to suit the structure to which it is attached.

It is believed that the construction and advantages of the structure shown may be apparent from the foregoing paragraphs taken in conjunction with the accompanying drawing without further detailed description.

While the preferred embodiment of the invention has been disclosed it is understood that minor changes in the details of construction, combination and arrangement of co-operating elements may be resorted to within the scope of what is claimed without departing from the spirit of the invention.

What I claim as my invention is:

1. In combination with a gang or disc plow structure having a plurality of plowing elements mounted thereon, a vertical shank having means to clamp the same to the plow structure, a horizontal axle extending from the shank, a land wheel mounted thereon to travel on the unplowed land adjacent the furrow, said clamp means consisting of a V shaped vertical plate secured to the vertical shank, a plate having a V shaped groove in which the said plate fits and securing bolts extending through the plate at each side of the groove into the plow structure, substantially as set forth.

2. In combination with a gang plow structure having a plurality of plowing elements mounted thereon, a vertical shank having means to clamp the same to the plow structure, a horizontal axle extending from the shank, a land wheel mounted thereon to travel on the unplowed land adjacent the furrow, said clamp means consisting of a V-shaped vertical portion on the vertical shank, a plate having a groove in which the said V-shaped shank portion fits and means for connecting the plate at each side of the groove to the plow structure substantially as set forth.

3. In combination with a gang plow structure having a plurality of plowing elements mounted thereon, a vertical shank having means to clamp the same to the plow structure, a horizontal axle extending from the shank, a land wheel mounted thereon to travel on the unplowed land adjacent the furrow, said clamp means including a plate having a V groove in which the vertical shank extends so that the walls of the groove engage opposite sides of the shank and means for connecting the plate at each side of the groove to the plow structure.

OTTO FLECK.